(12) United States Patent  
Soda et al.

(10) Patent No.: US 10,246,653 B2  
(45) Date of Patent: Apr. 2, 2019

(54) POWDER TRANSPORT DEVICE AND CHAR RECOVERY DEVICE

(71) Applicant: MITSUBISHI HITACHI POWER SYSTEMS, LTD., Yokohama (JP)

(72) Inventors: Yasuo Soda, Tokyo (JP); Yoshinori Koyama, Tokyo (JP); Yasunari Shibata, Yokohama (JP); Haruto Shinoda, Yokohama (JP)

(73) Assignee: MITSUBISHI HITACHI POWER SYSTEMS, LTD., Yokohama (JP)

( * ) Notice: Subject to any disclaimer, the term of this patent is extended or adjusted under 35 U.S.C. 154(b) by 0 days.

(21) Appl. No.: 15/329,391

(22) PCT Filed: Sep. 14, 2015

(86) PCT No.: PCT/JP2015/076063  
§ 371 (c)(1),  
(2) Date: Jan. 26, 2017

(87) PCT Pub. No.: WO2016/043167  
PCT Pub. Date: Mar. 24, 2016

(65) Prior Publication Data  
US 2017/0260465 A1    Sep. 14, 2017

(30) Foreign Application Priority Data

Sep. 16, 2014    (JP) .................. 2014-187526

(51) Int. Cl.  
*B65G 65/32* (2006.01)  
*C10J 3/84* (2006.01)  
(Continued)

(52) U.S. Cl.  
CPC ................ *C10J 3/84* (2013.01); *B65G 53/16* (2013.01); *B65G 53/18* (2013.01); *B65G 53/20* (2013.01);  
(Continued)

(58) Field of Classification Search  
CPC .................. B65G 53/20; B65G 65/32  
(Continued)

(56) References Cited

U.S. PATENT DOCUMENTS 2,866,272 A * 12/1958 Pedersen ............... F27B 7/2025  
                                                         34/583  
2,874,999 A *  2/1959 Lofgren ................. B65G 53/20  
                                                         406/120  
(Continued)

FOREIGN PATENT DOCUMENTS

GB    2 185 129    7/1987  
JP    59-76808     5/1984  
(Continued)

OTHER PUBLICATIONS

International Search Report dated Oct. 27, 2015 in International (PCT) Application No. PCT/JP2015/076063 with English translation.

(Continued)

*Primary Examiner* — Joseph A Dillon, Jr.  
(74) *Attorney, Agent, or Firm* — Wenderoth, Lind & Ponack, L.L.P.

(57) ABSTRACT

This powder transport device comprises: transport pipe (11) that can transport powder by way of gravity by having a prescribed angle of inclination; a porous plate (12) that is disposed along the transport pipe (11) so as to divide a line cross section into a top section and bottom section and form a powder line (11d) in the top section; an inert gas supply line for fluidization (13) that is provided under the porous plate (12) and supplies an assist gas (g) to the powder line (11d) through the porous plate (12); and a deposit status monitoring device (20) that constantly monitors the state of the powder deposited on the top face side of the porous plate (12) in the powder line (11d).

4 Claims, 8 Drawing Sheets

(51) Int. Cl.
  *B65G 53/20* (2006.01)
  *B65G 53/66* (2006.01)
  *C10J 3/46* (2006.01)
  *B65G 53/16* (2006.01)
  *C10J 3/56* (2006.01)
  *C10J 3/72* (2006.01)
  *B65G 53/18* (2006.01)

(52) U.S. Cl.
  CPC ............ *B65G 53/66* (2013.01); *C10J 3/46* (2013.01); *C10J 3/56* (2013.01); *C10J 3/723* (2013.01); *B65G 2203/042* (2013.01); *C10J 2200/09* (2013.01); *C10J 2300/165* (2013.01); *C10J 2300/1625* (2013.01); *Y02E 20/18* (2013.01)

(58) Field of Classification Search
  USPC .............................. 406/88, 89, 198; 414/676
  See application file for complete search history.

(56) References Cited

U.S. PATENT DOCUMENTS

| | | | | |
|---|---|---|---|---|
| 2,882,097 | A * | 4/1959 | Hamren | B65G 53/20 406/88 |
| 3,056,632 | A * | 10/1962 | Isler | B65G 53/20 406/52 |
| 3,751,214 | A * | 8/1973 | Wenzel | B65G 53/06 202/137 |
| 5,132,917 | A | 7/1992 | Bass | |
| 6,666,629 | B2 * | 12/2003 | Hirsch | B01J 8/0025 406/194 |
| 7,144,204 | B2 * | 12/2006 | Hilgraf | B65G 53/20 406/95 |
| 7,329,071 | B2 * | 2/2008 | Sonnichsen | B65G 53/18 406/144 |
| 7,875,249 | B2 * | 1/2011 | Murakami | B01J 8/0015 110/245 |
| 9,199,806 | B2 * | 12/2015 | Koyama | B65G 53/18 |
| 9,387,997 | B2 * | 7/2016 | Hu | B65G 53/523 |
| 9,446,913 | B2 * | 9/2016 | Soda | B65G 53/20 |
| 9,709,270 | B2 * | 7/2017 | Sato | F23G 5/30 |
| 9,834,733 | B2 * | 12/2017 | Yamamoto | C10K 1/02 |
| 2009/0003942 | A1 * | 1/2009 | Salmento | B65G 53/18 406/89 |
| 2009/0269149 | A1 * | 10/2009 | Hilgraf | |
| 2009/0304464 | A1 * | 12/2009 | Bjarno | B65G 53/20 406/168 |
| 2013/0140168 | A1 * | 6/2013 | Koyama | B65G 53/18 202/261 |
| 2013/0180362 | A1 * | 7/2013 | Kamikawa | C21B 11/00 75/392 |
| 2014/0231239 | A1 * | 8/2014 | Koyama | B65G 53/18 202/261 |
| 2015/0239684 | A1 | 8/2015 | Soda et al. | |
| 2015/0299591 | A1 * | 10/2015 | Yamamoto | B65G 53/20 414/160 |
| 2016/0298042 | A1 * | 10/2016 | Yamamoto | C10J 3/485 |

FOREIGN PATENT DOCUMENTS

| | | |
|---|---|---|
| JP | 61-18635 | 1/1986 |
| JP | 62-115824 | 5/1987 |
| JP | 3-2304 | 1/1991 |
| JP | 3-243704 | 10/1991 |
| JP | 4-230809 | 8/1992 |
| JP | 5-293761 | 11/1993 |
| JP | 9-178610 | 7/1997 |
| JP | 9-323822 | 12/1997 |
| JP | 3054788 | 6/2000 |
| JP | 2000-328074 | 11/2000 |
| JP | 2003-54760 | 2/2003 |
| JP | 2004-162965 | 6/2004 |
| JP | 2008-230825 | 10/2008 |
| JP | 2012-001280 | 1/2012 |
| JP | 2012-126571 | 7/2012 |
| JP | 2013-057048 | 3/2013 |
| JP | 2013-170185 | 9/2013 |
| JP | 2014-069927 | 4/2014 |

OTHER PUBLICATIONS

Written Opinion of the International Searching Authority dated Oct. 27, 2015 in International (PCT) Application No. PCT/JP2015/076063 with English translation.

Decision of Rejection dated Aug. 9, 2016 in Japanese Patent Application No. 2014-187526 with English translation.

* cited by examiner

INERT GAS
(FOR VIBRATION DEVICE)

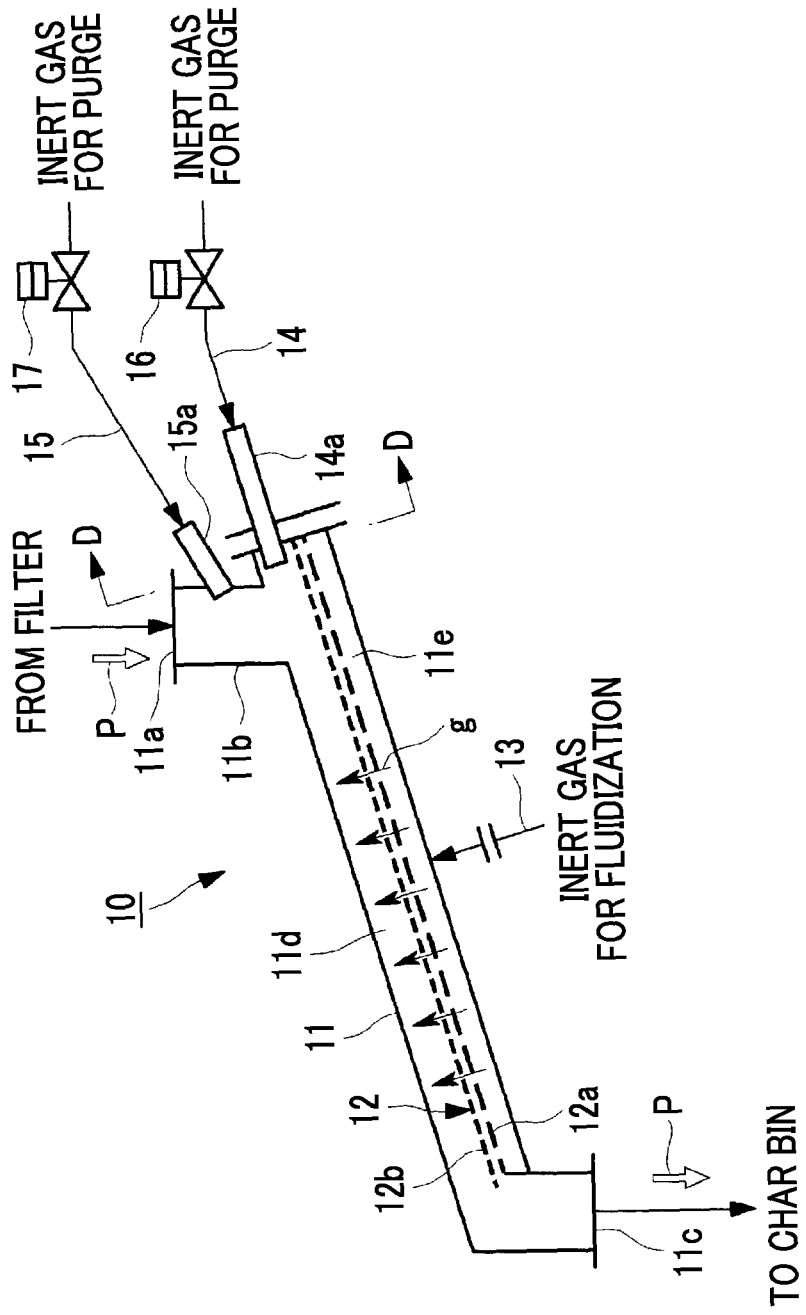

POWDER TRANSPORT DEVICE AND CHAR RECOVERY DEVICE

TECHNICAL FIELD

The present invention relates to a powder transport device and a char recovery device which are applied in an Integrated Gasification Combined Cycle (IGCC) or the like.

BACKGROUND ART

In an Integrated Gasification Combined Cycle (IGCC), coal which is a carbonaceous feedstock is gasified so as to be combined with combined cycle generation. Accordingly, the Integrated Gasification Combined Cycle is power generation equipment in which high efficiency and favorable environment can be achieved compared to coal fired power generation of the related art. The Integrated Gasification Combined Cycle has a great advantage in which coal having an abundant resource amount can be used, and it is known that advantages of the Integrated Gasification Combined Cycle further increase by enlarging kinds of the applied coal.

In general, the Integrated Gasification Combined Cycle of the related art is configured so as to include a coal supply device, a coal gasifier, a char recovery device, a gas clean-up unit, a gas turbine unit, a steam turbine unit, and a heat recovery steam generator. Accordingly, coal (pulverized coal) is supplied to the coal gasifier by the coal supply device, and a gasification agent (air, oxygen-enriched air, oxygen, steam, or the like) enters the coal gasifier.

In this coal gasifier, coal is combusted so as to be gasified, and syngas (coal gas) is generated. In addition, after an unreacted portion (char) of the coal is removed from the generated syngas in the char recovery device so as to clean-up the generated syngas, the syngas is supplied to the gas turbine unit.

The syngas supplied to the gas turbine unit is combusted as a fuel by a combustor to generate a high-temperature and high-pressure syngas, and the syngas is supplied to the gas turbine of the gas turbine unit to drive the gas turbine.

After the gas turbine is driven, thermal energy of the exhaust gas is recovered by the heat recovery steam generator to generate steam. This steam is supplied to the steam turbine unit, and the steam turbine is driven by the steam. Accordingly, it is possible to generate electricity by a generator which has the gas turbine and the steam turbine as a drive source.

Meanwhile, the exhaust gas of which the thermal energy is recovered by the heat recovery steam generator is discharged to the atmosphere via a stack.

The char recovery device of the above-described Integrated Gasification Combined Cycle removes the contained char from raw syngas generated by the coal gasifier using multiple dust collection devices. In addition, the recovered char is returned to the coal gasifier by a prescribed amount by a char supply device.

That is, a bin system having a char transport device is applied to the char recovery device. A bin system includes a char bin, a char discharge line through which char recovered by each dust collection device is discharged to the char bin, and a char supply line through which the char recovered by the char bin is supplied to a char supply hopper. In addition, one or multiple char bins, char discharge lines, char supply hoppers, and char supply lines are provided when necessary.

Moreover, in a char recovery device disclosed in PTL 1 below, for example, a fluidized chute (powder transport device) 10 shown in FIGS. 8A and 8B is used. The fluidized chute 10 has a configuration in which a porous plate 12 serving as a perforated plate is disposed inside a transport pipe 11 which is installed at a prescribed angle of inclination to form a powder transport line and a line cross section is divided into a powder line 11$d$ and an assist gas accumulation space 11$e$. In addition, when powder char (a void arrow P) supplied from a filter is transported to a char bin, an assist gas (inert gas for fluidization g) enters through the porous plate 12 disposed along the powder transport line and fluidizes the powder char (the void arrow P) supplied from the filter.

For example, as shown in FIG. 9, the above-described porous plate 12 has a configuration in which a first porous plate 12$a$ and a second porous plate 12$b$ which is disposed above the first porous plate 12$a$ are in close contact with each other. In this case, a punching metal in which multiple holes 12$c$ through which the assist gas g passes are formed is used as the first porous plate 12$a$, and a stainless wire net having a thinner mesh than the diameter of the hole 12$c$ is used as the second porous plate 12$b$.

Moreover, in FIG. 8A, a reference numeral 13 indicates an inert gas supply line for fluidization, reference numerals 14 and 15 indicate inert gas supply lines for purge through which an inert gas for purge is supplied from the upper end portion side of the transport pipe 11, and reference numerals 16 and 17 indicate on/off valves.

In addition, PTL 2 below discloses that a syngas is used as gas for transporting pulverized coal or char.

CITATION LIST

Patent Literature

[PTL 1] Japanese Unexamined Patent Application Publication No. 2014-69927
[PTL 2] Japanese Unexamined Patent Application Publication No. 2000-328074

SUMMARY OF INVENTION

Technical Problem

In the above-described fluidized chute 10, the inert gas for fluidization serving as the assist gas is constantly supplied at a fixed flow rate, and the inert gas for purge is constantly or intermittently ventilated.

Meanwhile, whether or not char of a fixed amount is supplied to the fluidized chute 10 can be judged from an increase amount of a container (for example, char supply hopper or the like) receiving the char. However, time is required until a judgment result is obtained. Accordingly, in a case where the char is deposited in the transport pipe 11 of the fluidized chute 10 and the char of the fixed amount cannot be supplied, time is required until this is detected. Therefore, time is required to perform fluidization again.

Specifically, in the case where the char is deposited in the transport pipe 11, it is necessary to remove the deposition by increasing a supply amount of inert gas for fluidization or inert gas for purge. However, it is difficult to fluidize the deposited char again. Accordingly, in order to rapidly cope with this, it is preferable to monitor a fixed amount supply state of the fluidized chute 10 in real time.

As described above, if a fixed amount is not supplied to the fluidized chute 10, that is, if a fixed amount of char cannot be transported between hoppers, the char exceeds a storage limitation of each hopper, and the operation of the coal gasifier is stopped, which is not preferable.

From the above-described circumstances, in the fluidized chute 10, it is preferable to monitor a fixed amount supply state (presence or absence of deposition) of powder (char) in real time.

The present invention is made to solve the above-described problems, and an object thereof is to provide a powder transport device in which a fixed amount supply state of powder can be monitored in real time, and a char recovery device using the powder transport device.

Solution to Problem

In order to solve the above-described problems, the present invention adopts the following means.

According to an aspect of the present invention, there is provided a powder transport device, including: a powder transport line which can transport powder by way of gravity by having a prescribed angle of inclination; and a deposit status monitoring device which constantly monitors a status of the powder deposited in the powder transport line.

According to the powder transport device, since the powder transport device includes the deposit status monitoring device which constantly monitors the state of the powder deposited in the transport line, it is possible to monitor a fixed amount supply state (presence or absence of deposition) of the flowing powder in real time. In addition, in a case where it is detected that abnormality occurs in the fixed amount supply of the powder, it is possible to rapidly perform measures required to fluidize the powder again before the deposition of the powder increases.

In the powder transport device, preferably, the powder transport device further includes a perforated plate which is disposed along the powder transport line so as to divide a line cross section into a top section and a bottom section and form a powder line in the top section, and an assist gas supply device which is provided below the perforated plate and supplies an assist gas to the powder line through the perforated plate.

According to this power transport device, it is possible to constantly monitor the state of the powder deposited on the upper surface side of the porous plate serving as the perforated plate in the powder line.

In the powder transport device, preferably, the deposit status monitoring device includes a sensor which detects a deposition state of the powder in the powder transport line, and the powder transport device further includes a controller which judges the deposition state based on a detection value of the sensor. As the sensor, there is a temperature sensor, a γ-ray transmitter-receiver, or the like.

In the powder transport device, preferably, the deposit status monitoring device includes a temperature sensor which detects a wall surface temperature of the powder transport line. Accordingly, it is possible to judge the fixed amount supply state of the powder in real time from the change of the wall surface temperature. Specifically, since a flow amount of high-temperature powder decreases when flow abnormality occurs such as a case where the flow of the powder deteriorates or a case where the powder is deposited, compared to the time of the fixed amount supply in which the high-temperature powder smoothly flows, the heating amount of the wall surface decreases and the wall surface temperature decrease. Accordingly, it is possible to judge occurrence of abnormality in the fixed amount supply by monitoring and detecting the temperature decrease.

In this case, preferably, the temperature sensor detects an inner wall surface temperature of the powder transport line. That is, since the inner wall surface is close to the flowing powder, the inner wall surface temperature is more sensitively changed than the outer wall surface, and it is possible to accurately and correctly perform real-time judgment.

In the powder transport device, preferably, multiple temperature sensors are provided in an axial direction of the powder transport line. Accordingly, even in a case where a powder transport line having a long transport distance is monitored, it is possible to rapidly and correctly judge the fixed amount supply state of the powder in real time. That is, if at least one of the multiple temperature sensors which are provided in the axial direction of the powder transport line detects a temperature decrease, it can be judged that flow abnormality occurs. In addition, it is possible to assume the position in the axial direction at which the flow abnormality occurs from the position of the temperature sensor which detects the temperature decrease.

In the powder transport device, preferably, multiple temperature sensors are provided in a peripheral direction of the powder transport line. Accordingly, it is possible to rapidly and correctly judge the fixed amount supply state of the powder in real time regardless of the position (position in the peripheral direction) of the line cross section in which deposition of the powder occurs. That is, if at least one of the multiple temperature sensors which are provided in the peripheral direction of the powder transport line detects a temperature decrease, it can be judged that flow abnormality occurs. In addition, it is possible to assume the position in the peripheral direction at which the flow abnormality occurs from the position of the temperature sensor which detects the temperature decrease. Particularly, the above-described disposition of the temperature sensor is effective to a powder transport line having a large diameter.

In the powder transport device, the deposit status monitoring device may include an observation window which is provided at a position of the peripheral wall higher than the position of the perforated plate in the powder transport line and through which the inside of the line can be monitored in a direction intersecting the flow direction, and a sensor which measures the powder flow inside the powder line through the observation window in a non-contact manner.

In the powder transport device, since the sensor which measures the flow state of the powder in a non-contact manner is installed in the observation window, it is possible to reliably judge the fixed amount supply state in the powder line in real time. In this case, as the sensor suitable for measuring the powder flow in a non-contact manner, there is irradiation of laser, light, and ultrasound, a flow sensor, or the like.

In the powder transport device, preferably, the observation window includes an inert gas charging nozzle. Accordingly, since an inert gas enters to remove the powder, it is possible to reliably secure a visual field of the observation window.

In the powder transport device, preferably, multiple observation windows and multiple sensors are provided in the axial direction of the powder transport line. Accordingly, even in a case where a powder transport line having a long transport distance is monitored, it is possible to rapidly and correctly judge the fixed amount supply state of the powder in real time.

In the powder transport device, the deposit status monitoring device may include a sensor which measures the powder flow in the powder line from the upstream side or the downstream side in the flow direction in a non-contact manner at a higher position than the perforated plate in the powder transport line.

The deposit status monitoring device can reliably judge the flow state of the powder in the powder line in real time. In this case, as a suitable sensor, there is an ultrasonic level meter which judges the flow state by transmitting and receiving ultrasound.

In the powder transport device, the deposit status monitoring device may include a γ-ray transmitter which is installed on the upstream side in a flow direction or the downstream side in a flow direction in the powder line and a γ-ray receiver which is installed on the downstream in the flow direction or the upstream side in the flow direction in the powder line, at a higher position than the perforated plate in the powder transport line.

The deposit status monitoring device can reliably judge the flow state of the powder in the powder line in real time. In this case, the γ-ray receiver receives a γ-ray transmitted from the γ-ray transmitter, and measures a damping factor of the γ-ray so as to measure powder density inside a space.

In the powder transport device, preferably, one or multiple vibration devices having an inert gas as a drive source are provided on the lower surface of the perforated plate. Accordingly, since the deposited powder is vibrated so as to be agitated and scattered, it is possible to fluidize the powder again.

According to another aspect of the present invention, there is provided a char recovery device which recovers a unreacted portion from a raw syngas generated by gasifying a solid fuel, including: a first dust collection device which is connected to a generation line of the raw syngas; a second dust collection device which is connected to a first gas discharge line in the first dust collection device; a bin which is connected to a first unreacted portion discharge line in the first dust collection device and a second unreacted portion discharge line in the second dust collection device; an unreacted portion return line through which the unreacted portion is returned from the bin; and the powder transport device which is provided in at least one line of the second unreaction portion discharge line and the unreacted portion return line.

Since the char recovery device includes the powder transport device, in a case where the fixed amount supply state (presence or absence of deposition) of the flowing powder is monitored in real time and it is detected that abnormality occurs in the fixed amount supply of the powder, it is possible to rapidly perform measures required to fluidize the powder again before the deposition of the powder increases.

Advantageous Effects of Invention

In the powder transport line which transports powder by way of gravity, since it is possible to constantly monitor the state of the powder deposited in the powder transport line and ascertain the fixed amount supply state (presence or absence of deposition) of the powder in real time, it is possible to rapidly perform measures required to fluidize the powder again. As a result, it is possible to prevent or suppress the powder from exceeding a storage limitation of each hopper due to the powder of the fixed amount being not supplied. Accordingly, it is possible to prevent or suppress the operation of the char recovery device using the powder transport line of the present invention, the coal gasifier having the char recovery device, or the like from being stopped.

BRIEF DESCRIPTION OF DRAWINGS

FIG. 8A is a view showing a powder transport device of the related art, and is a sectional view showing the internal structure of the powder transport line.

DESCRIPTION OF EMBODIMENTS

Hereinafter, embodiments of a powder transport device and a char recovery device according to the present invention will be described with reference to the drawings.

Figure 1A:
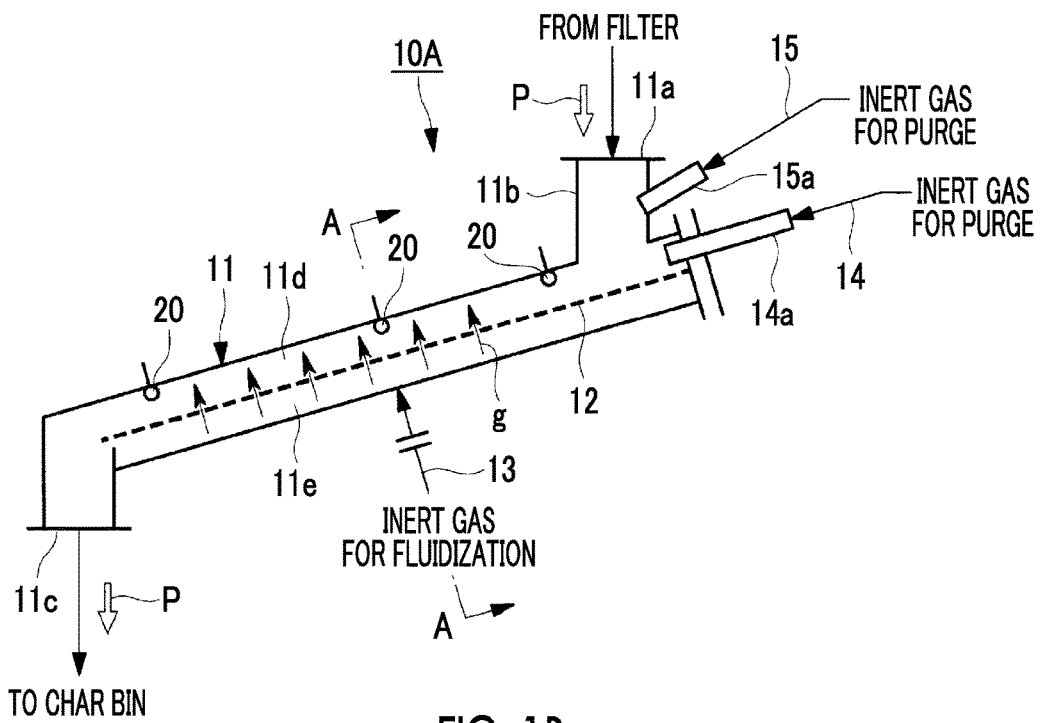
FIG. 1A shows a view showing an embodiment (first embodiment) of a powder transport device according to the present invention and is a sectional view showing the internal structure of the powder transport line.
Figure 1B:
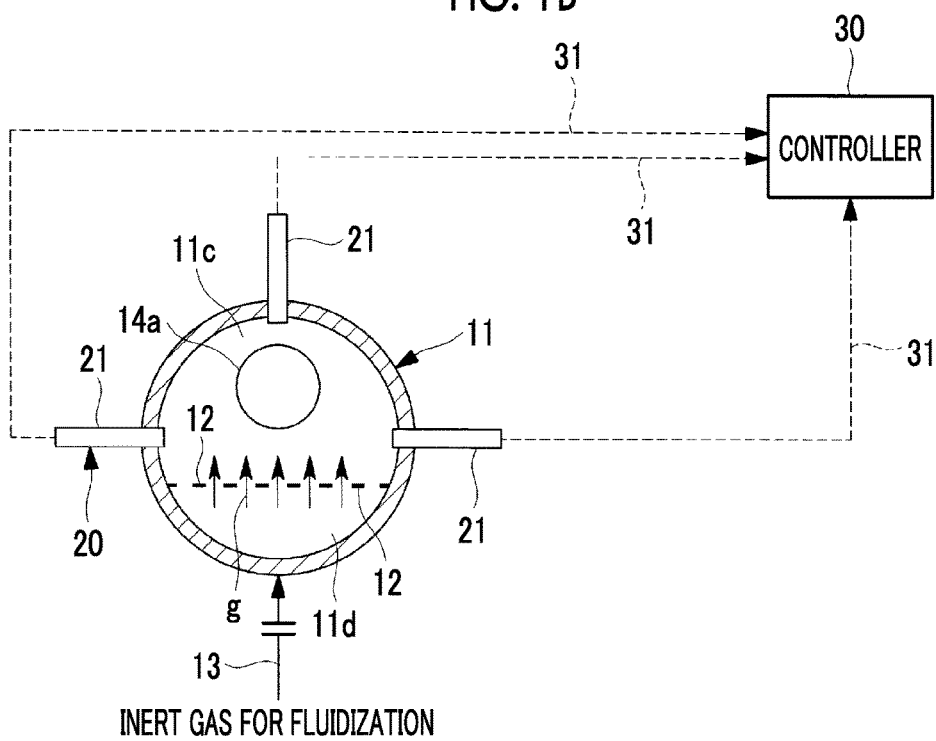
FIG. 1B is a sectional view taken along line A-A of FIG. 1A.

For example, a fluidized chute (powder transport device) 10A of a first embodiment shown in FIGS. 1A and 1B is applied to an Integrated Gasification Combined Cycle (IGCC) in which coal which is an kind of a solid fuel is gasified to supply a raw syngas to a gas turbine unit, and electricity is generated by a gas turbine which is operated using the raw syngas as a fuel gas. Specifically, the fluidized chute 10A is used in a char transport line of a char recovery device 1 which removes and recovers unreacted (unburnt) powder in contained in the raw syngas generated by a coal gasifier, that is, char. Particularly, the fluidized chute 10A is effective to a case where a sufficient angle of inclination cannot secured according to layout conditions to decrease the entire height of an apparatus, or the like.

Figure 7:
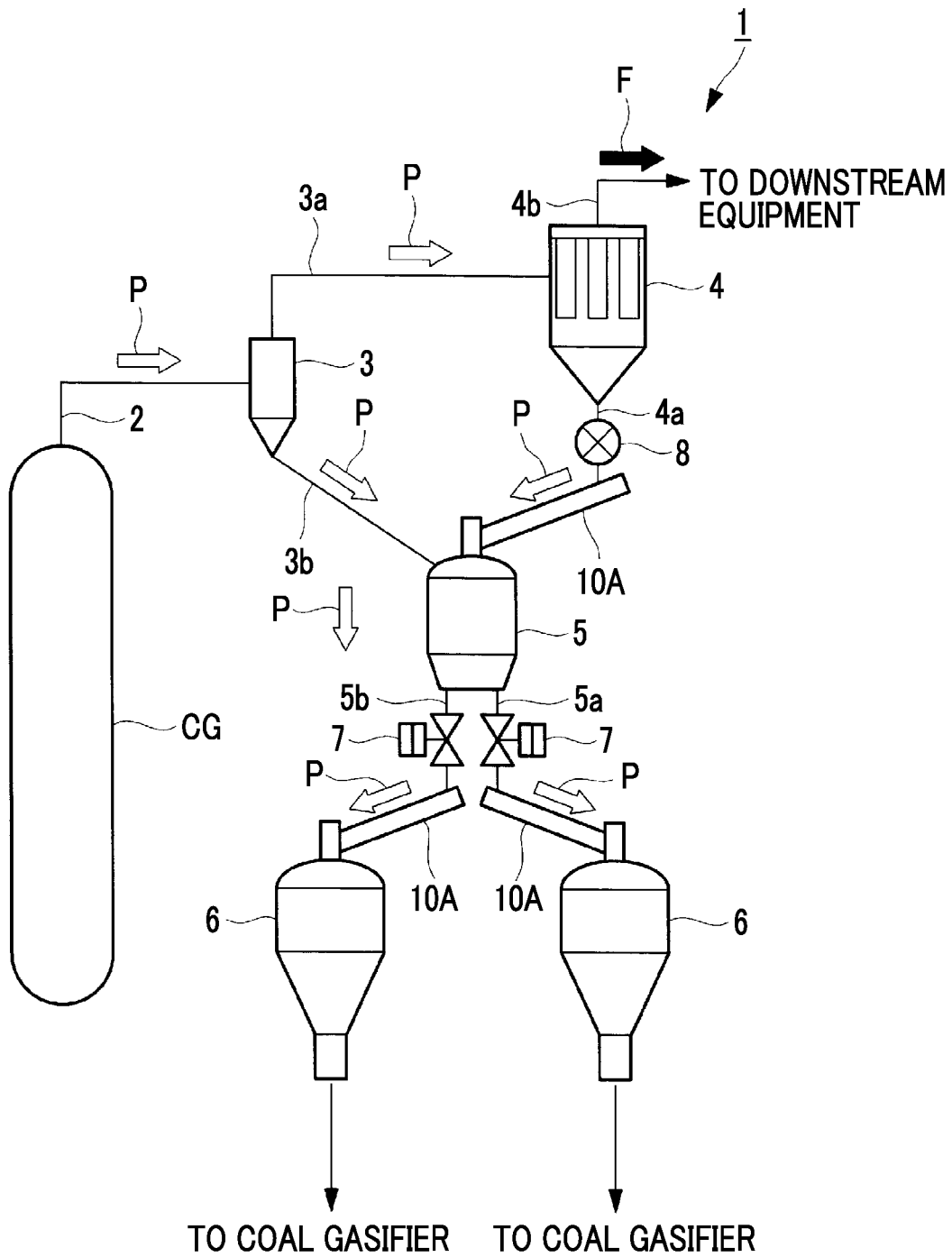
FIG. 7 is a view showing a configuration example of an apparatus to which the powder transport device and the char recovery device are applied to and is a view showing a configuration example of the char recovery device in coal gasification equipment.

The char recovery device 1 shown in FIG. 7 includes a cyclone (first dust collection device) 3 which is connected to a generation line 2 of the raw syngas in order to separate, remove, and recover char of powder from the raw syngas generated by gasifying coal using a coal gasifier CG. Gas and particles (powder) in the raw syngas are separated from each other by the cyclone 3. In addition, in FIG. 7, a void arrow P indicates the flow of the char or the flow of the char contained in the gas, and a black arrow F indicates a fuel gas before various processing is performed.

The gas of the raw syngas separated by the cyclone 3 has a high temperature, and contains minute particles of the char having a high temperature similar to the temperature of the gas. Accordingly, it is necessary to remove the minute particles of the char to use the gas of the raw syngas as a fuel gas. Therefore, the gas of the raw syngas is introduced to a filter (second dust collection device) 4 through a separated gas discharge line (first gas discharge line) 3a connected to the cyclone 3.

Meanwhile, the char separated by the cyclone 3 is introduced to a char bin (bin) 5 by way of gravity through a first char discharge line (first unreacted portion discharge line) 3b connected to the cyclone 3.

The char remaining in the raw syngas is further separated and removed so as to be recovered by the filter 4. In this time, the recovered char still has a high temperature. The char recovered by the filter 4 is introduced to the char bin 5 is connected to a second char discharge line (second unreacted portion discharge line) 4a. The fluidized chute 10A described below is provided in the second char discharge line 4a. In addition, a reference numeral 8 in the drawings indicates a rotary valve provided in the second char discharge line 4a.

Meanwhile, the raw syngas in which the char is removed by the filter 4 is fed to downstream equipment through the raw syngas discharge line 4b to be subjected to various processing so as to be used as a fuel gas.

For example, the char collected in the char bin 5 is fed to char supply hoppers 6 so as to be stored. In the shown configuration example, a pair of char supply hoppers 6 are installed, and portions between the hoppers 6 and the char bin 5 are connected by char return lines (unreacted portion return lines) 5a and 5b. In this case, the pair of char supply hoppers 6 are alternately used according to opening and closing of an on/off valve 7. Moreover, in the shown configuration example, the fluidized chutes 10A described below are also provided in the char return lines 5a and 5b.

In addition, if necessary, the char stored in the char supply hoppers 6 is supplied to the coal gasifier CG again so as to be gasified.

The fluidized chute 10A according to the first embodiment of the present invention has a structure in which a porous plate 12 serving as a perforated plate is disposed inside a transport pipe 11 which is installed at a prescribed angle of inclination and forms a powder transport line. In addition, in descriptions below, the char transport line in which the fluidized chute 10A shown in FIGS. 1A and 1B is installed is the second char discharge line 4a through which the char is transported from the filter 4 to the char bin 5.

In the fluidized chute 10A, the prescribed angle of inclination at which the transport pipe 11 is installed is an angle at which the char which is powder can drop by way of gravity. The shown transport pipe 11 has a circular cross section, and in the transport pipe 11, a char receiving nozzle 11b having a char supply port 11a is provided in the vicinity of a high-side end portion which is inclined in an axial direction (longitudinal direction) with respect to a horizontal plane, and a char discharge port 11c is provided on a low-side end portion. Accordingly, the approximately perpendicular second char discharge line 4a connected to the filter 4 is connected to the char supply port 11a, and a high temperature char can be introduced into the transport pipe 11 through the char supply port 11a. In addition, the char discharge port 11c is connected to the upper portion of the char bin 5, and the transported char is discharged to the char bin 5 by way of gravity through the char discharge port 11c.

In addition, in the porous plate 12, the line cross section along the transport pipe 11 is divided into a top section and a bottom section, and the porous plate 12 is disposed such that a powder line 11d is formed on the top section inside the transport pipe 11, and an assist gas accumulation space 11e is formed on the bottom section.

Figure 9:
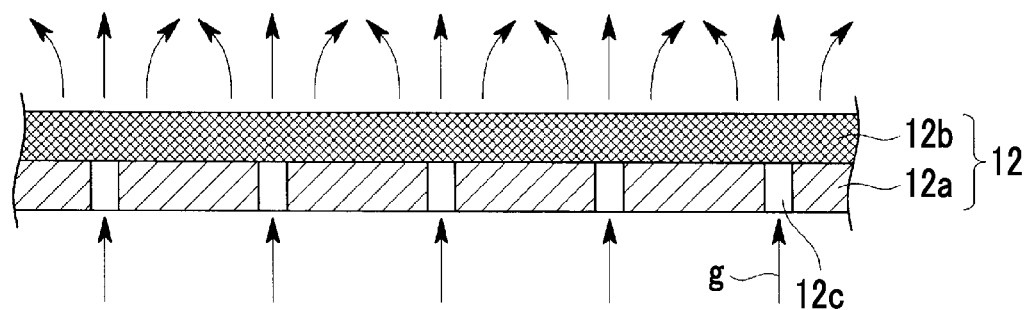
FIG. 9 is a sectional view showing a configuration example of a perforated plate.

For example, as shown in FIG. 9, the above-described porous plate 12 has a configuration in which a first porous plate 12a and a second porous plate 12b are in close contact with each other. In addition, for example, a punching metal in which multiple holes 12c through which an assist gas g passes are formed is used as the first porous plate 12a, and a stainless wire net having a thinner mesh than the diameter of the hole 12c is used as the second porous plate 12b. However, the present invention is not limited to this. That is, in the porous plate 12, an inert gas supply line for fluidization 13 provided below the porous plate 12 is connected to the assist gas accumulation space 11e, and the assist gas g supplied from the inert gas supply line for fluidization 13 into the assist gas accumulation space 11e may be supplied to be approximately uniformly supplied into the entire region in the powder line 11d through the porous plate 12.

When the powder char supplied from the filter 4 is transported to the char bin 5, since the assist gas g enters through the porous plate 12 disposed along the transport pipe 11, the char inside the transport pipe 11 floats on the porous plate 12 and is fluidized.

In addition, inert gas supply lines 14 and 15 is provided in the transport pipe 11, and an inert gas for purge is supplied through the inert gas supply lines 14 and 15 from the vicinity of the high-side end portion in which the char supply port 11a is provided.

An inert gas for purge is supplied from a nozzle 14a provided to penetrate a plate material having the closed upper end surface into the powder line 11d through the one inert gas supply line for purge 14, and an inert gas for purge is supplied from a nozzle 15a provided to penetrate the peripheral wall surface of the char receiving nozzle 11b into the char receiving nozzle 11b of the powder line 11d through the other inert gas supply line for purge 15.

Figure 8B:
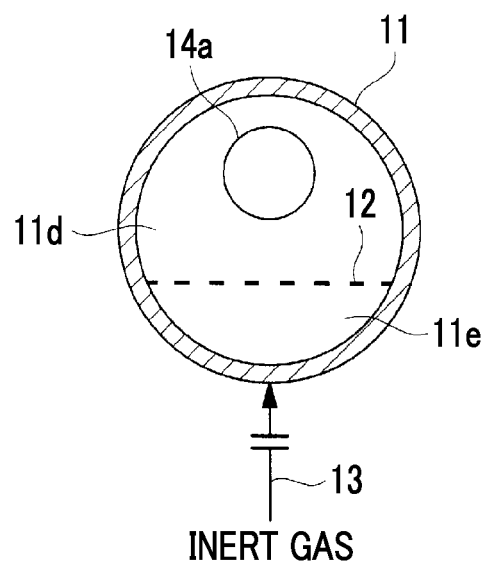
FIG. 8B is a sectional view taken along line D-D of FIG. 8A.

The inert gas supply lines for purge 14 and 15 are similar to those of the related art shown in FIG. 8A, and include on/off valves 16 and 17 (not shown). Accordingly, the inert gas supply lines for purge 14 and 15 can supply the inert gas for purge if necessary by operating the on/off valves 16 and 17 according to the transport state of the char.

In addition, the fluidized chute 10A according to the first embodiment includes a deposit status monitoring device 20 which constantly monitors the state of the powder (fixed amount supply state) deposited on the upper surface side of the porous plate 12 in the transport pipe 11, that is, the deposition stat of the char.

The deposit status monitoring device 20 includes a temperature sensor 21 which constantly detects the wall surface temperature of the transport pipe 11. For example, as a suitable temperature sensor 21, a thermocouple which is connected to a controller 30 by a signal line 31 may be used.

For example, the controller 30 is configured of a Central Processing Unit (CPU), a Random Access Memory (RAM), a Read Only Memory (ROM), a computer readable storage medium, or the like. In addition, for example, a series of processing for realizing various functions is stored in the storage medium or the like in a program format, the CPU reads out the program by the RAM or the like, and processing and calculation of information are executed so as to realize various functions. In addition, an aspect in which the program is installed in the ROM or other storage media in advance, an aspect in which the program is provided in a state where the program is stored in the computer readable storage medium, an aspect in which the program is transmitted via wire or wireless communication means, or the like may applied. As the computer readable medium, there is a magnetic disk, an magneto-optical disk, a CD-ROM, a DVD-ROM, a semiconductor memory, or the like.

Figure 2:
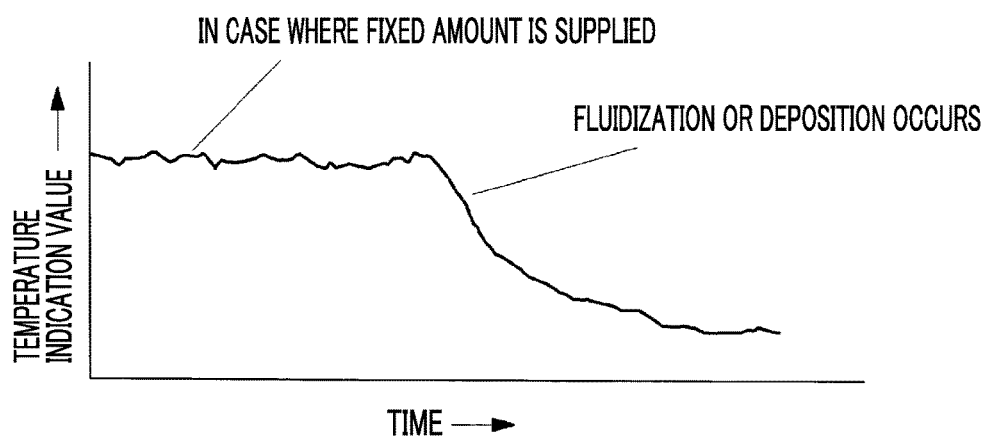
FIG. 2 is a view explaining judgment of a fixed amount supply state and flow deterioration or deposition occurrence by measuring a wall surface temperature of the powder transport line, and shows an example in which an indication value of a thermometer used as a temperature sensor indicated by a vertical axis is changed with respect to a time indicated by a horizontal axis.

The deposit status monitoring device 20 can judge the fixed amount supply state of the char from a change of the wall surface temperature in real time. Specifically, when flow abnormalities such as a case where the flow of char which is in a high-temperature state deteriorates or a case where the char which is in a high-temperature state is deposited on the porous plate 12 occurs, the flow amount of the high-temperature char decreases. Accordingly, as shown in FIG. 2, compared to when the fixed amount of the char is supplied in which the char smoothly flows, since the heating amount of the wall surface of the transport pipe 11 receiving from the high-temperature char decrease, the wall surface temperature is greatly changed so as to be decreased due to heat dissipation with respect to the outside air or the like.

That is, when flow abnormalities occur, the heating amount receiving from the high-temperature char decreases, stayed chart is cooled, and the temperature decreases. Accordingly, it is not possible to maintain the wall surface temperature when the fixed amount of the char is supplied, and as a result, the temperature of the wall surface decreases. Therefore, it is possible to judge abnormality occurrence of a fixed amount supply by monitoring the temperature decrease using the deposit status monitoring device 20.

The temperature measurement performed by the above-described temperature sensor 21 is not particularly limited as long as the measurement temperature is the wall surface temperature of the transport pipe 11. However, in order to rapidly and correctly judge the temperature measurement in real time, preferably, the inner wall surface temperature (inner surface metal temperature) of the transport pipe 11 is measured. That is, since the inner wall surface temperature is more sensitively changed than that of the outer wall surface, the temperature sensor 21 detects the inner wall surface temperature of the transport pipe 11 close to the flowing char.

In this case, preferably, the protrusion amount of the temperature sensor 21 toward the inside the transport pipe 11 is set to the required minimum, and the tip of the temperature sensor 21 is installed so as to be coincident with the inner wall surface. The installation of the temperature sensor 21 does not interfere with the fluidization of the char in the transport pipe 11.

In addition, since the temperature sensor 21 measures the inner surface metal temperature, it is possible to confirm whether or not the state of the inner wall surface is a state where the inner wall surface temperature decreases to a dew point or less and the outer wall surface should be heated.

Since the fluidized chute 10A includes the deposit status monitoring device 20 which constantly monitors the state of the char deposited on the upper surface side of the porous plate 12 inside the transport pipe 11, it is possible to monitor the fixed amount supply state of the flowing char, that is, the presence or absence of the deposition of the flowing char, in real time. In addition, in a case where the deposit status monitoring device 20 detects that the char is deposited in the transport pipe 11 and abnormality in the fixed amount supply of the char occurs, for example, a control signal is output from the controller 30, and it is possible to rapidly perform measures required to fluidize the char again before the deposition of the powder increases.

In addition, as a specific example of the measures for fluidizing the char again, there are increasing the supply amount of the inert gas for fluidization or inert gas for purge or starting the supply of the inert gas for purge which is intermittently supplied and is in a supply stop state.

One deposit status monitoring device 20 may be provided at an appropriate location in the transport pipe 11. However, preferably, multiple deposit status monitoring devices 20 are installed at appropriate locations to more rapidly and correctly perform the monitoring. In the installations of the multiple deposit status monitoring devices 20, the multiple temperature sensors 21 may be disposed (in the shown configuration example, at three locations at equal pitch in the axial direction) in the axial direction of the transport pipe 11, or the multiple temperature sensor 21 may be disposed (in the shown configuration example, at three locations at 90° pitch in the peripheral direction) in the peripheral direction. More preferably, the multiple temperature sensors 21 are disposed in the axial direction and the peripheral direction.

If the multiple temperature sensors 21 are disposed in the axial direction, even in a case where the transport pipe 11 having a long transport distance is monitored, it is possible to monitor the transport pipe 11 so as to measure rapidly and correctly the temperature change in real time. That is, if at least one of the multiple temperature sensors 21 which are provided in the axial direction of the transport pipe 11 detects the temperature decrease, it can be judged that flow abnormality occurs. In addition, it is possible to assume the position in the axial direction at which the flow abnormality occurs from the position of the temperature sensor 21 which detects the temperature decrease.

If the multiple temperature sensors 21 are disposed in the peripheral direction, even in a case where the large-diameter transport pipe 11 having a large line sectional area is monitored, it is possible to rapidly and correctly judge the temperature change in real time regardless of the position (position in the peripheral direction) of the line cross section in which deposition of the char occurs. That is, if at least one of the multiple temperature sensors 21 which are provided in the peripheral direction of the transport pipe 11 detects the temperature decrease, it can be judged that flow abnormality occurs. In addition, it is possible to assume the position in the peripheral direction at which the flow abnormality occurs from the position of the temperature sensor 21 which detects the temperature decrease.

Accordingly, if the multiple temperature sensors 21 are disposed in the axial direction and the peripheral direction, it is possible to more rapidly and correctly monitor a sensitive temperature change with regardless of the dimension of the transport pipe 11. In addition, it is more correctly ascertain the position at which the flow abnormality occurs.

Figure 3A:
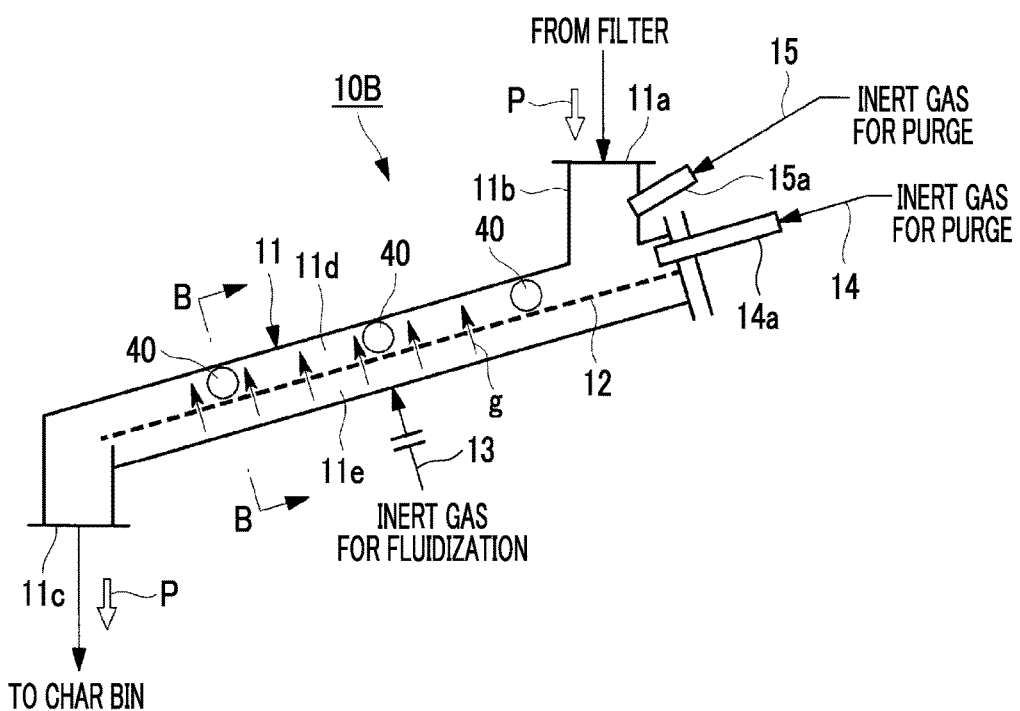
FIG. 3A is a view showing an embodiment (second embodiment) of the powder transport device according to the present invention and is a sectional view showing the internal structure of the powder transport line.
Figure 3B:
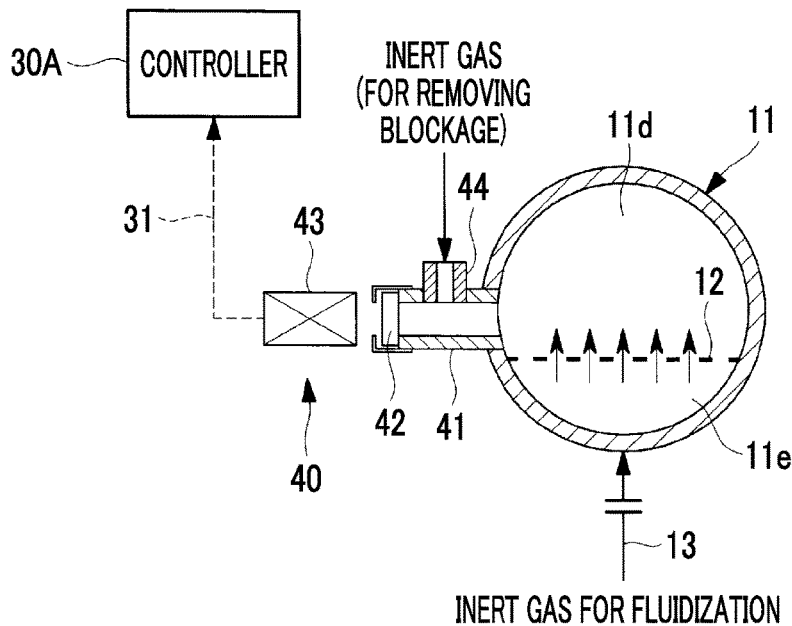
FIG. 3B is a sectional view taken along line B-B of FIG. 3A.

Next, a fluidized chute 10B of a second embodiment shown in FIGS. 3A and 3B will be described, the same reference numerals are assigned to the portions similar to those of the above-described first embodiment, and descriptions thereof are omitted.

A deposit status monitoring device 40 provided in the fluidized chute 10B of the second embodiment includes an observation window 42 which is provided at a peripheral wall position which is higher than the porous plate 12 in the transport pipe 11. In the observation window 42, a nozzle 41 which protrudes in the horizontal direction from the transport pipe 11 is provided, and the observation window 42 which is a visible member such as a heat-resistant and pressure-resistant glass is attached to the tip portion of the nozzle 41. Accordingly, the observation window 42 of the deposit status monitoring device 40 can monitor the inside of the line of the transport pipe 11 in the direction interesting the flow direction of the char.

In addition, the deposit status monitoring device 40 includes a sensor 43 which can measure the flow of the char in the transport pipe 11 from the observation window 42 in a non-contact manner. The sensor 43 is connected to the controller 30A via the signal line 31.

In this case, as a suitable sensor 43, there is a sensor which measures a change or the like of a reflection state by emitting laser, light, and ultrasound, a flow sensor, or the like.

In the deposit status monitoring device 40, since the sensor 43 which measures the flow state of the char in a non-contact manner is provided in the observation window 42, it is possible to reliably judge the fixed amount supply state in the transport pipe 11 in real time without interfering with the flow of the char. Accordingly, in a case where the deposit status monitoring device 40 detects that the char is deposited in the transport pipe 11 and abnormality in the fixed amount supply of the char occurs, for example, it is possible to rapidly perform measures required to fluidize the char again before the deposition of the char increases.

Moreover, in a case where the char is deposited, for example, since a time when the sensor receives the reflection of laser is shortened if the char is irradiated with laser, it is possible to judge that abnormality occurs in the fixed amount supply in this case.

Preferably, the above-described observation window 42 includes an inert gas charging nozzle 44. An inert gas for removing blockage is charged through the nozzle 44 so as to remove the char if necessary. That is, in a case where the char stays inside the observation window 42, it is possible to reliably secure a visual field of the observation window 42 by removing the char using the charged inert gas.

In addition, according to the reasons similar to those of the first embodiment, preferably, multiple deposit status monitoring devices 40 having the observation window 42 and the sensor 43 are provided in the axial direction of the transport pipe 11. That is, even when the monitoring target is the transport pipe 11 having a long transport distance, it is possible to rapidly and correctly judge the fixed amount supply state of the char in real time by the multiple deposit status monitoring devices 40 disposed in the axial direction.

Figure 4:
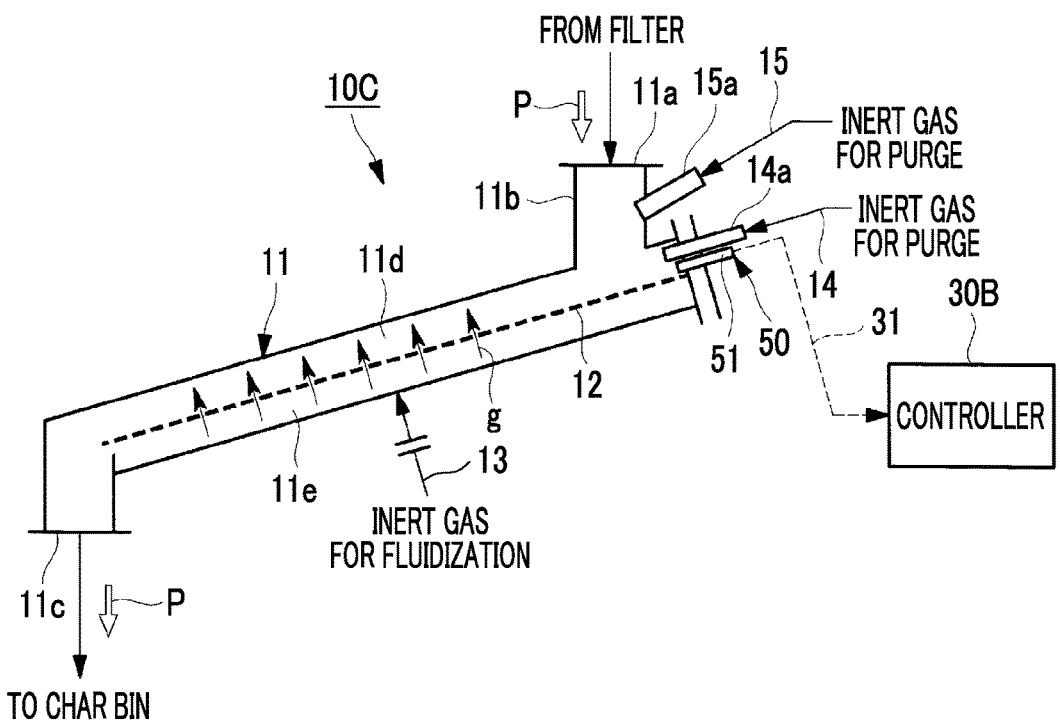
FIG. 4 is a view showing an embodiment (third embodiment) of the powder transport device according to the present invention and is a sectional view showing the internal structure of the powder transport line.

Next, a fluidized chute 10C of a third embodiment shown in FIG. 4 will be described, the same reference numerals are assigned to the portions similar to those of the above-described first and second embodiments, and descriptions thereof are omitted.

In the third embodiment, a deposit status monitoring device 50 provided in the fluidized chute 10C includes a sensor 51 which measures the flow of the char in the transport pipe 11 from the upstream side or the downstream side in the flow direction in a non-contact manner at a higher position than the porous plate 12 of the transport pipe 11. The sensor 51 is connected to a controller 30B via the signal line 31.

In this case, the suitable sensor 51 is a sensor which performs transmitting and receiving in one of the upstream side and the downstream side in the transport pipe 11. Specifically, the suitable sensor 51 is an ultrasonic level meter which judges the flow state by transmitting and receiving ultrasound.

According to the deposit status monitoring device 50, it is possible to reliably judge the flow state of the char in the transport pipe 11 in real time. That is, since it is possible to measure the distance to the staying char by measuring a reflection time of ultrasound, it is possible to judge whether or not abnormality occurs in the fixed amount supply from the measured distance.

Figure 5:
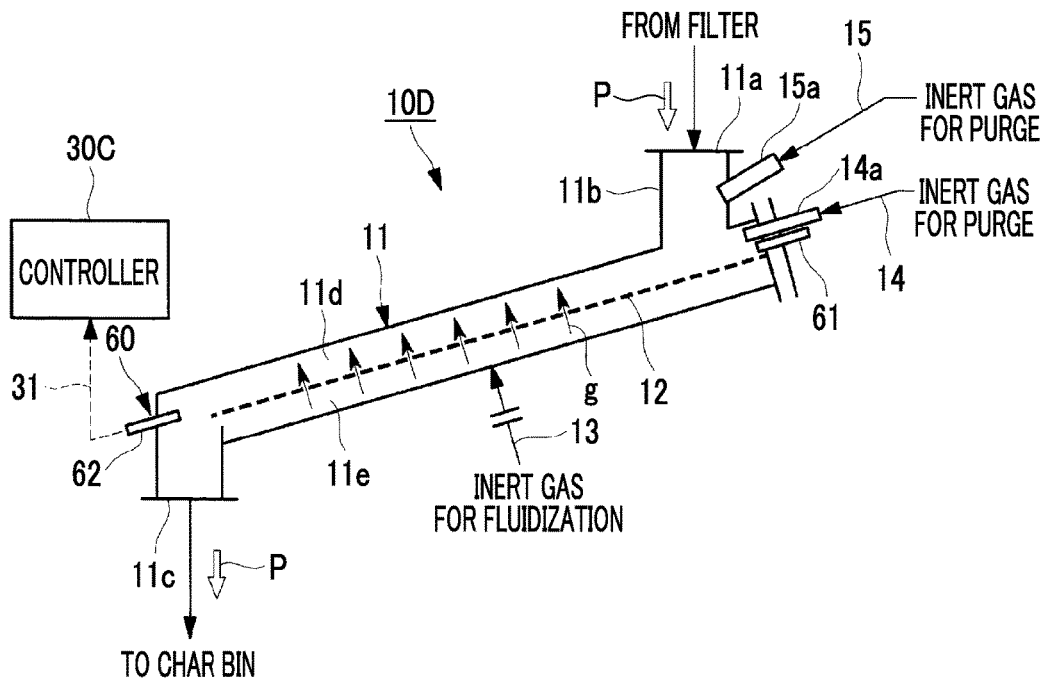
FIG. 5 is a view showing a modification example of the embodiment (third embodiment) shown in FIG. 4 and is a sectional view showing the internal structure of the powder transport line.

In addition, in a modification example shown in FIG. 5 of the third embodiment, a deposit status monitoring device 60 of a fluidized chute 10D includes a γ-ray transmitter 61 which is installed on the upstream side in the flow direction or the downstream side in the flow direction in the transport pipe 11, and a γ-ray receiver 62 which is installed on the downstream in the flow direction or the upstream side in the flow direction in the transport pipe 11, at higher positions than the porous plate 12 of the transport pipe 11. That is, in the suitable γ-ray transmitter-receiver in this case, the transmitter is installed on one of the upstream side and the downstream side of the transport pipe 11, the receiver is installed on the other of the upstream side or the downstream side of the transport pipe 11, and transmitting and receiving are performed.

According to the deposit status monitoring device 60, it is possible to reliably judge the flow state of the char in the transport pipe 11 in real time. In this case, in the shown configuration example, the downstream-side γ-ray receiver 62 receives the γ-ray transmitted from the upstream-side γ-ray transmitter 61, a damping factor of the γ-ray is measured, and a powder density inside the space is measured. The positions of γ-ray transmitter 61 and the γ-ray receiver 62 may be reversed. In addition, the measurement result of the γ-ray receiver 62 is input to a controller 30C via the signal line 31.

Figure 6A:
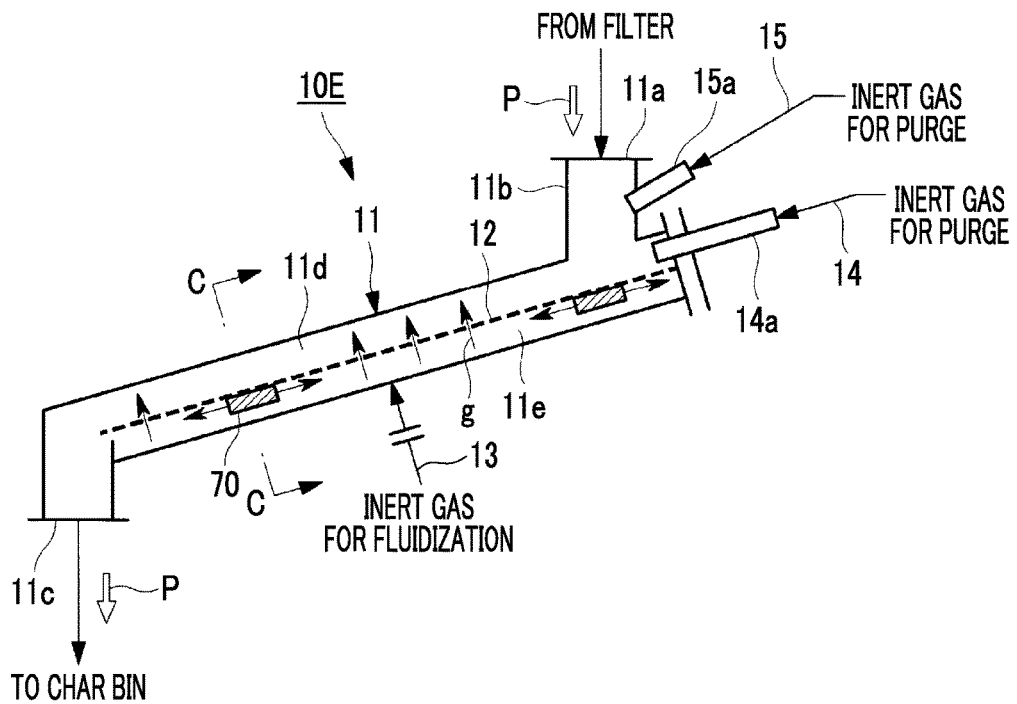
FIG. 6A is a view showing an embodiment (fourth embodiment) of the powder transport device according to the present invention and is a sectional view showing the internal structure of the powder transport line.
Figure 6B:
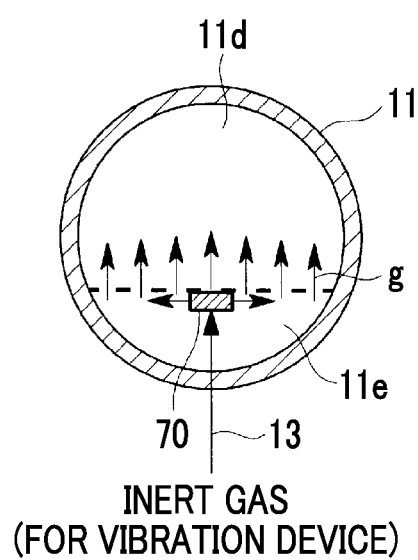
FIG. 6B is a sectional view taken along line C-C of FIG. 6A.

Finally, a fluidized chute 10E of a fourth embodiment shown in FIGS. 6A and 6B will be described, the same reference numerals are assigned to the portions similar to those of the above-described embodiments, and descriptions thereof are omitted.

In this fourth embodiment, the fluidized chute 10E includes one or multiple vibration devices 70 having an inert gas as a drive source on the lower surface of the porous plate 12. For example, the vibration device 70 may be a device which receives a compressed inert gas, rotates a rigid ball or the like at a high speed, and generates centrifugal vibrations. It is possible to vibrate the deposited char via the porous plate 12 by vibrating the vibration device 70.

In addition, since the vibrations agitate and scatters the deposited char, it is possible to fluidize the deposited char again. In this case, when the deposit status monitoring device 20 of each embodiment detects abnormalities of the fixed amount supply, the vibration device 70 may receive signals from the controller 30 or the like so as to be operated.

Moreover, the char recovery device 1 of the present embodiment includes the fluidized chutes 10A to 10E of the embodiments and the modification examples, it is possible to monitor the fixed amount supply state changed according to the deposition of the flowing char in real time using the deposit status monitoring devices 20 to 60.

As a result, in a case where it is detected that abnormality occurs in the fixed amount supply of the char, it is possible to rapidly perform measures required to fluidize the char again before the deposition of the char increases, that is, the deposition amount of the char increases.

In this way, according to the above-described embodiments, it is possible to constantly monitor the state of the char deposited on the upper surface side of the porous plate 12 in the transport pipe 11 through which the char is transported by way of gravity and it is possible to ascertain the fixed amount supply state (presence or absence of deposition) of the char in real time. Accordingly, it is possible to rapidly perform measures required to fluidize the char again. As a result, it is possible to prevent or suppress the char from exceeding a storage limitation of hoppers such as the char bin 5 or the char supply hopper 6 due to the char of the fixed amount being not supplied. Accordingly, it is possible to prevent or suppress the operation of the char recovery device 1 using the above-described fluidized chute 10A or the like, the coal gasifier having the char recovery device 1, or the like from being stopped.

In addition, the present invention is not limited to the above-described embodiments. For example, the present invention may be applied to powder different from the char and may be appropriately modified within a scope which does not depart from the gist.

REFERENCE SIGNS LIST

1: char recovery device
2: generation line
3: cyclone (first dust collection device)
3a: separated gas discharge line (first gas discharge line)
3b: first char discharge line (first unreacted portion discharge line)
4: filter (second dust collection device)
4a: second char discharge line (second unreacted portion discharge line)
4b: raw syngas discharge line
5: char bin (bin)
5a, 5b: char return line (unreacted portion return line)
6: char supply hopper
10, 10A to 10E: fluidized chute (powder transport device)
11: transport pipe (powder transport line)
11d: powder line
11e: assist gas accumulation space
12: porous plate (perforated plate)
13: inert gas supply line for fluidization
14, 15: inert gas supply line for purge
20, 40, 50, 60: deposit status monitoring device
21: temperature sensor
30, 30A to 30C: controller
41: nozzle
42: observation window
43, 51: sensor
61: γ-ray transmitter
62: γ-ray receiver
70: vibration device

The invention claimed is:

1. A powder transport device, comprising:
a powder transport line which can transport powder by way of gravity by having a prescribed angle of inclination;
a porous plate which is disposed along the powder transport line to divide a line cross section into a top section and a bottom section and form a powder line in the top section;
a supply line which is provided below the porous plate and supplies an inert gas for fluidization to the powder line through the porous plate;
a fixed amount supply state monitoring device which detects a wall surface temperature of the powder transport line and includes multiple temperature sensors for monitoring a fixed amount supply state of flowing powder in the powder line, the multiple temperature sensors being provided in an axial direction of the powder transport line; and
a controller which controls an amount of the inert gas for fluidization supplied to the supply line so as to fluidize the powder deposited in the powder line, if at least one detection value of the multiple temperature sensors indicates a state where a flow amount of powder decreases in association with a decrease in the wall surface temperature of the powder transport line.

2. The powder transport device according to claim 1, wherein the multiple temperature sensors detect an inner wall surface temperature of the powder transport line.

3. The powder transport device according to claim 1, wherein the multiple temperature sensors are provided in a peripheral direction of the powder transport line.

4. The powder transport device according to claim 1, further comprising
one or multiple vibration devices having an inert gas as a drive source being provided on the lower surface of the porous plate.

* * * * *